(12) United States Patent
Kotecha et al.

(10) Patent No.: US 9,360,854 B2
(45) Date of Patent: Jun. 7, 2016

(54) PREVENTING DISTRACTED DRIVING

(75) Inventors: Lalit R. Kotecha, San Ramon, CA (US);
Matthew W. Nelson, Pleasanton, CA (US); Sagiv Draznin, Walnut Creek, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 565 days.

(21) Appl. No.: 13/568,752

(22) Filed: Aug. 7, 2012

(65) Prior Publication Data

US 2014/0043135 A1 Feb. 13, 2014

(51) Int. Cl.
*G05B 23/02* (2006.01)
*G05B 19/042* (2006.01)
*B60K 37/06* (2006.01)

(52) U.S. Cl.
CPC ........... *G05B 19/0428* (2013.01); *B60K 37/06* (2013.01); *B60K 2350/355* (2013.01)

(58) Field of Classification Search
None
See application file for complete search history.

(56) References Cited

U.S. PATENT DOCUMENTS

| 7,937,075 | B2* | 5/2011 | Zellner | H04M 1/6075 455/187.1 |
| 8,335,502 | B2* | 12/2012 | Oesterling | H04W 4/046 455/419 |
| 8,594,705 | B2* | 11/2013 | Osann, Jr. | H04W 4/02 455/418 |
| 8,933,782 | B2* | 1/2015 | Pierfelice | H04L 63/10 340/5.82 |
| 2009/0098855 | A1* | 4/2009 | Fernandez | H04M 1/6075 455/410 |
| 2010/0305807 | A1* | 12/2010 | Basir et al. | 701/33 |
| 2011/0275321 | A1* | 11/2011 | Zhou | H04M 1/6091 455/41.2 |

FOREIGN PATENT DOCUMENTS

EP 2340668 A2 * 7/2011

* cited by examiner

*Primary Examiner* — Firmin Backer
*Assistant Examiner* — Shawna M Kingston

(57) ABSTRACT

A first device is configured to receive, from a second device, an indication of a presence of a third device inside of a vehicle, where the first device is located inside of the vehicle. The first device is further configured to receive data associated with the vehicle, determine a vehicle condition, of the vehicle, based on the data associated with the vehicle, and deactivate a function associated with the third device based on the vehicle condition. The first device may prevent the third device from performing the deactivated function when an instruction to perform the deactivated function is received by the third device via manual input. The first device may permit the third device to perform the deactivated function when the instruction to perform the deactivated function is received by the third device via a hands-free device.

22 Claims, 8 Drawing Sheets

| Vehicle condition | Function activation rules ||||| 
|---|---|---|---|---|---|
| | Emergency voice calls | Voice calls | Text messages | E-mails | Play video |
| Parking brake engaged | | | | | |
| Vehicle moving | | X | | | |
| Vehicle not moving, parking brake disengaged | | | X | | |
| Engine running, parking brake engaged | | | | X | X |

Fig. 5

PREVENTING DISTRACTED DRIVING

BACKGROUND

Users sometimes use user devices to perform some tasks, such as placing and/or receiving telephone calls, sending and/or receiving text messages, selecting and/or playing videos, etc. During operation of a vehicle, the act of performing tasks via the user device poses a safety hazard to the user and to surrounding motorists. Additionally, vehicle laws in many jurisdictions prevent the use of user devices during operation of a vehicle.

BRIEF DESCRIPTION OF THE DRAWINGS

FIG. 5 illustrates an example data structure that may be stored by one or more devices, such as a function control device;

DETAILED DESCRIPTION OF THE PREFERRED EMBODIMENTS

The following detailed description refers to the accompanying drawings. The same reference numbers in different drawings may identify the same or similar elements.

Systems and/or methods, described herein, may prevent a user, associated with a user device, from using the user device while operating a motor vehicle. In some implementations, a key device, associated with a motor vehicle (referred to hereinafter as a "vehicle"), may detect a user device, and may communicate with a function control device to prevent usage of the user device when the key device detects the user device.

Additionally, or alternatively, the function control device may allow the user device to perform a function (e.g., send a text message, place a telephone call, access a web page, select or play audio and/or video content, open an application, receive inputs/instructions via a user interface of the user device, etc.) when an instruction to perform the function is received by the user device from a hands-free device (e.g., a voice recognition Bluetooth headset, a voice recognition wired headset, or some other hands-free device). Additionally, or alternatively, the function control device may prevent the user device from performing the function when the instruction to perform the function is not received by a hands-free device (e.g., received by manual input) and based on vehicle conditions (e.g., the vehicle being stopped, the vehicle moving, etc.), except for when the instruction relates to placing an emergency call. Additionally, or alternatively, the function control device may prevent the vehicle from starting if the key device does not detect a user device.

In some implementations, the key device may detect multiple user devices (e.g., a first user device associated with a passenger of a vehicle, and a second user device associated with an operator of the vehicle). In the situation where the key device detects multiple user devices, the function control device may prevent usage of a single user device, based on receiving an indication of which user device is associated with the operator of the vehicle.

Figure 1:
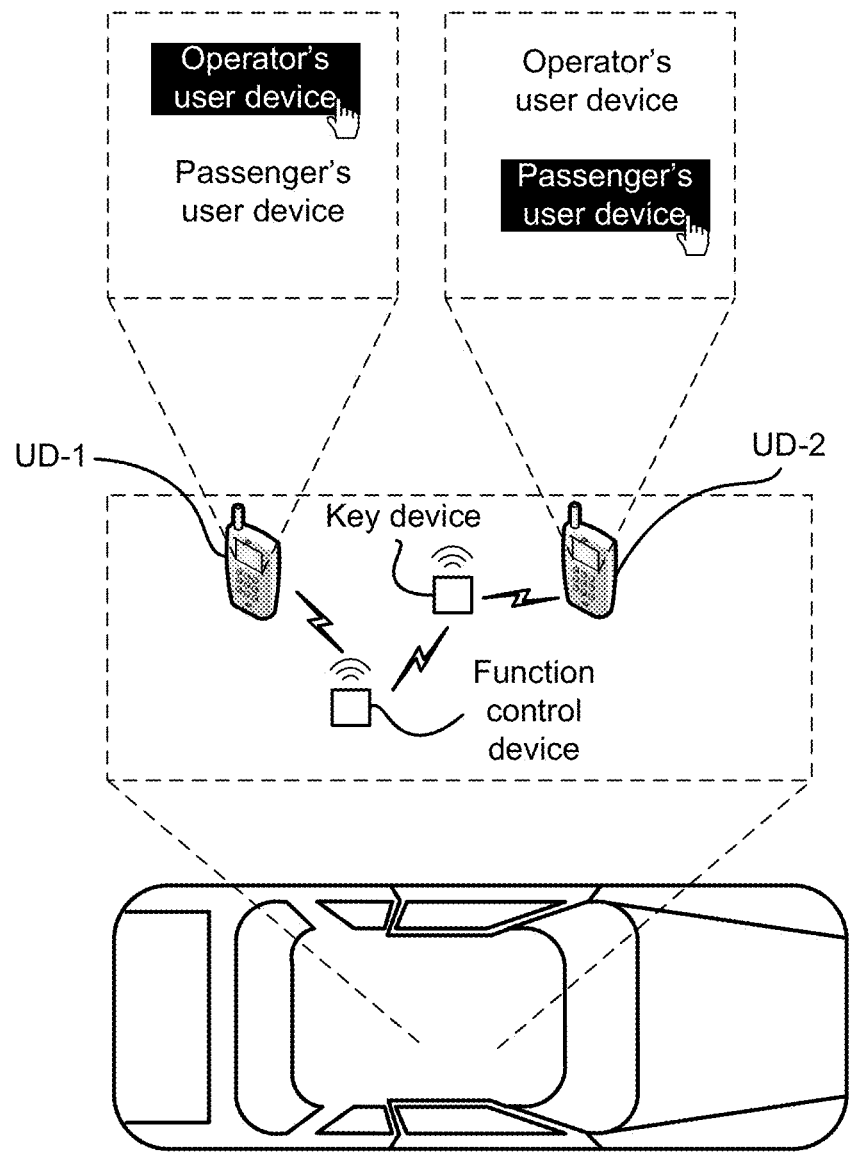
FIG. 1 illustrates an example overview of an implementation described herein.

FIG. 1 illustrates an example overview of an implementation described herein. In FIG. 1, assume that a first user device (i.e., "UD-1") is associated with an operator of a vehicle and that a second user device (i.e., "UD-2") is associated with a passenger of the vehicle. Further assume that UD-1 and UD-2 enter the vehicle (e.g., corresponding to when the operator and the passenger enter the vehicle). In some implementations, a key device (e.g., an ignition key, a key transponder, a key fob, a user device docking station, etc.), associated with the vehicle, may detect UD-1 and UD-2 based on a wireless connection (e.g., a near field communications (NFC) connection, a Bluetooth connection, a radio connection, and/or some other connection) and/or based on a wired connection.

In some implementations, a user device (e.g., UD-1 and/or UD-2) may transmit an idle signal, such as an NFC signal, a Bluetooth signal, and/or some other type of signal. The key device may detect the user device without user interaction (e.g., based on the idle signal transmitted by the user device). Additionally, or alternatively, the key device may detect the user device based on the user device receiving an instruction from the user to broadcast a signal to allow the key device to detect the user device.

In some implementations, a function control device may communicate with UD-1 and UD-2 via a wired or wireless connection (e.g. a Bluetooth connection, an NFC connection, or some other type of connection), based on the key device detecting UD-1 and UD-2. The function control device may send an instruction to UD-1 and UD-2 to identify which user device (e.g., which one of UD-1 or UD-2) is associated with the operator. As shown in FIG. 1, the user device may receive an instruction from the function control device to identify which user device is associated with the operator. In the example shown in FIG. 1, the function control device may receive an indication that UD-1 is associated with the operator of the vehicle and may allow the user device to perform a function when an instruction to perform the function is received by UD-1 from a hands-free device. Additionally, or alternatively, the function control device may prevent the user device to perform a function when the instruction to perform the function is not received from a hands-free device, except for when the instruction relates to placing an emergency call.

Figure 2:
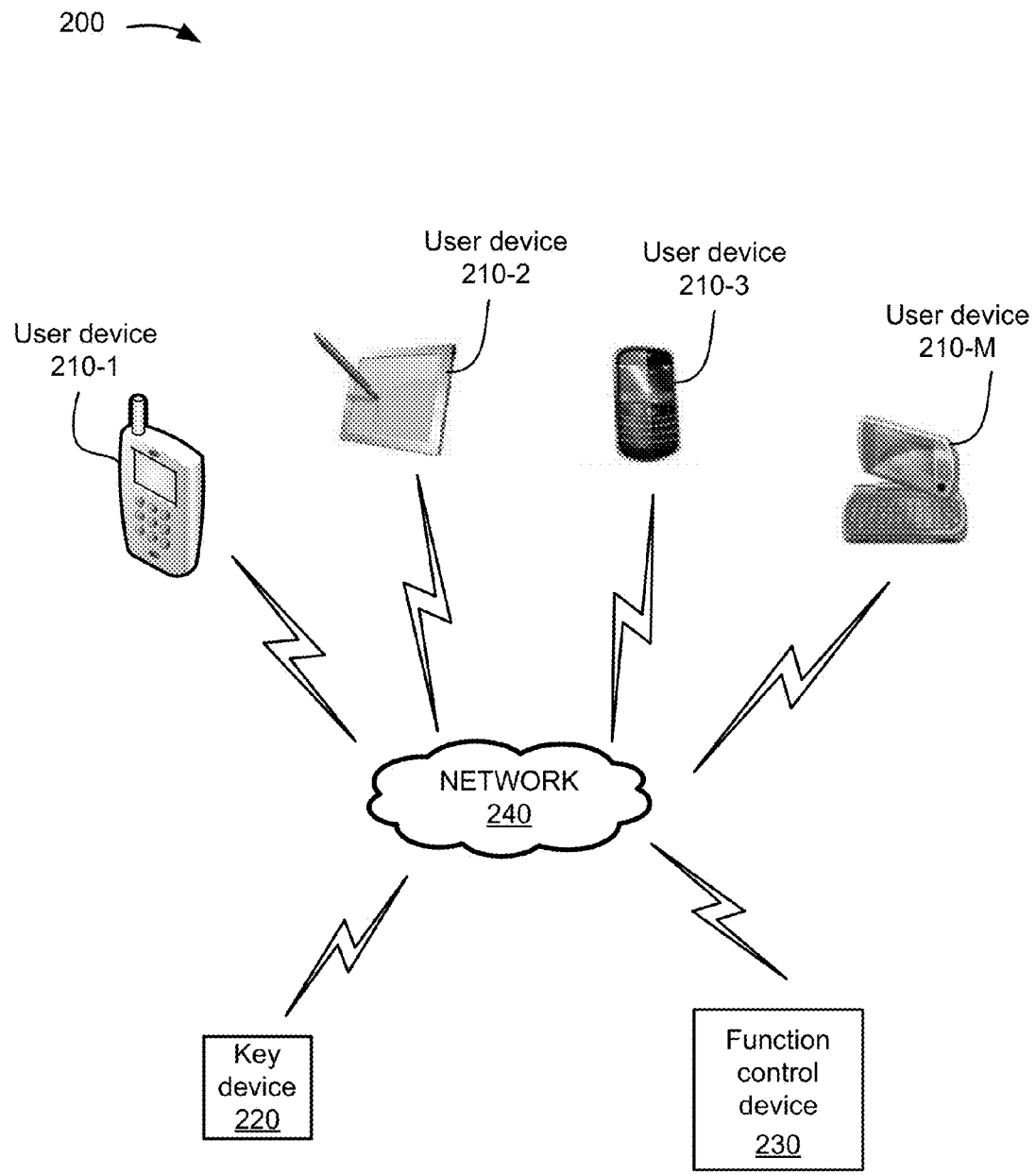
FIG. 2 illustrates an example environment in which systems and/or methods, described herein, may be implemented.

FIG. 2 is a diagram that illustrates an example environment 200 in which systems and/or methods, described herein, may be implemented. As shown in FIG. 2, environment 200 may include user devices 210-1, 210-2, . . . , 210-M (where M≥1) (collectively referred to as "user devices 210," and individually as "user device 210"), key device 220, function control device 230, and/or network 240. While FIG. 2 shows a particular quantity and arrangement of devices, in practice, environment 200 may include additional devices, fewer devices, different devices, or differently arranged devices than are shown in FIG. 2. For example, each of key device 220 and function control device 230 may be implemented as multiple, possibly distributed, devices. Alternatively, key device 220 and function control device 230 may be implemented within a single device. Further, a function described as being performed by one device may be performed by another device.

User device 210 may include any device capable of communicating via a network, such as network 240. For example, user device 210 may correspond to a mobile communication device (e.g., a smart phone or a personal digital assistant (PDA)), or a portable computer device (e.g., a laptop or a tablet computer). In some implementations, user device 210 may receive instructions to perform some task (e.g., send a text message, send an electronic mail (e-mail) message, place a telephone call, play a video, etc.). User device 210 may receive the instructions via manual user input and/or via voice command input. In some implementations, user device 210 may transmit a signal, such as a Bluetooth signal, an NFC signal, and/or some other type of signal to communicate with key device 220 and/or function control device 230. User device 210 may transmit the signal based on an instruction to transmit the signal, or may transmit the signal automatically without receiving an instruction to transmit the signal. In some implementations, multiple user devices 210 may receive instructions from function control device 230 to identify which instance of user device 210 is associated with an operator of a vehicle.

Key device 220 may include any device associated with a vehicle. For example, key device 220 may correspond to an ignition key, a key transponder, a key fob, a mobile phone docking station, and/or some other type of device associated with a vehicle. In some implementations, key device 220 may detect one or more user devices 210 by via an NFC connection, a Bluetooth connection, a radio connection, and/or some other type of connection. In some implementations, key device 220 may send an indication of the detection of user device 210 to function control device 230.

Function control device 230 may include any device associated with a vehicle. For example, function control device 230 may correspond to computing device, a vehicle control device, or a collection of computing devices and/or vehicle control devices associated with a vehicle. In some implementations, function control device 230 may determine vehicle conditions (e.g., vehicle moving, vehicle not moving, vehicle drive gear engaged, vehicle reverse gear engaged, vehicle parking brake engaged, etc.) and may permit user device 210 to perform a function when an instruction to perform the function is received user device 210 from a hands-free device. Additionally, or alternatively, function control device 230 may prevent user device 210 to perform a function when an instruction to perform the function is received by user device 210 from a source other than a hands-free device (e.g., manual input), except for when the instruction relates to placing an emergency call. Additionally, or alternatively, function control device 230 may prevent a vehicle from starting if key device 220 does not detect user device 210.

Network 240 may include any type of network or a combination of networks. For example, network 240 may include a local area network (LAN), a wireless LAN (WLAN), an ad hoc network, a Bluetooth network, a near-field communications (NFC) network, or a combination of networks. Each of user device 210, key device 220, and/or function control device 230 may connect to network 240 via a wireless connection, a wired connection, or a combination thereof.

Figure 3:
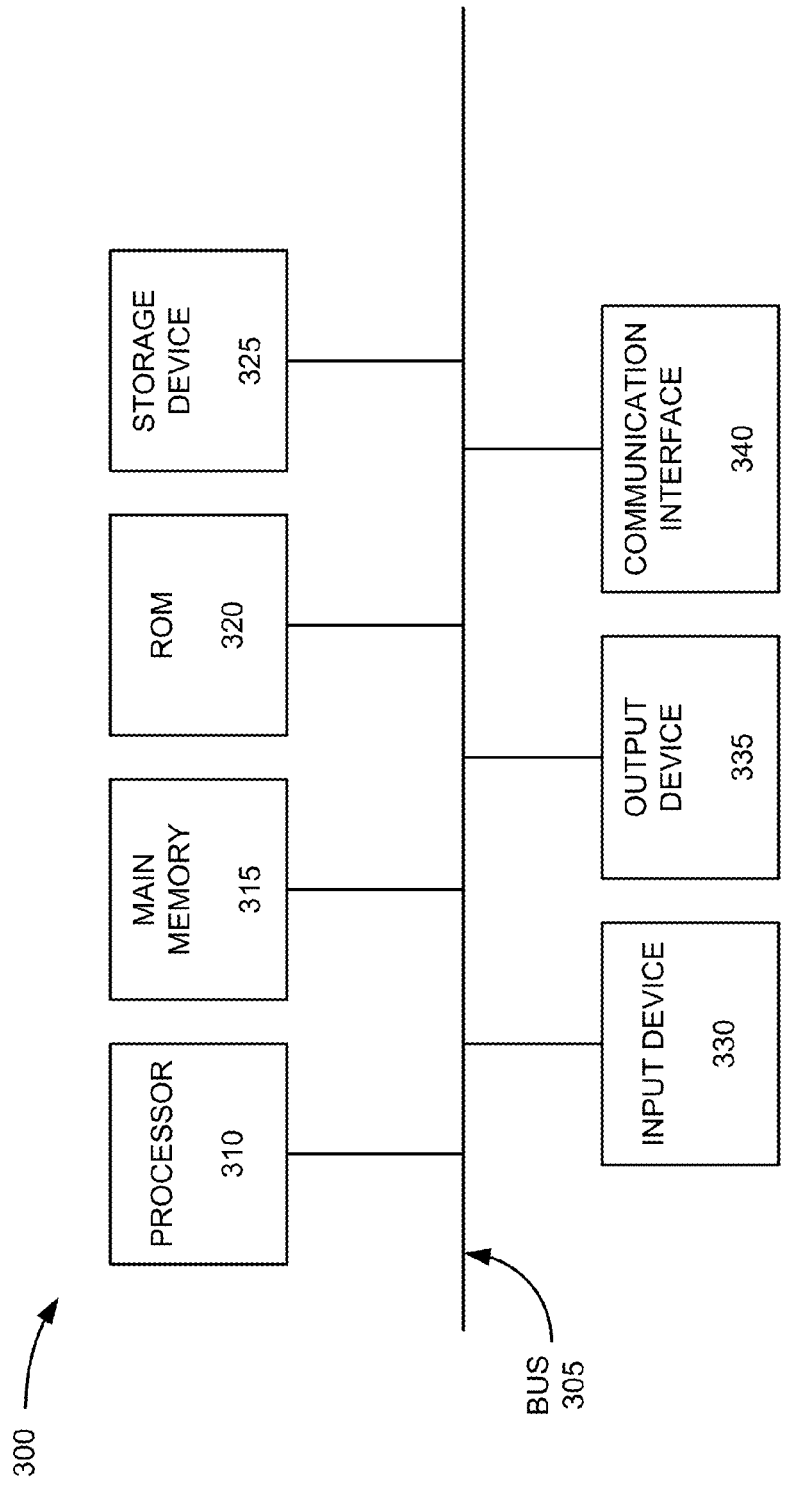
FIG. 3 illustrates example components of a device that may be used within the environment of FIG. 2.

FIG. 3 illustrates example components of a device 300 that may be used within environment 200 of FIG. 2. Device 300 may correspond to user device 210, key device 220, and/or function control device 230. Each of user device 210, key device 220, and/or function control device 230 may include one or more devices 300, and/or one or more components of device 300.

As shown in FIG. 3, device 300 may include a bus 305, a processor 310, a main memory 315, a read only memory (ROM) 320, a storage device 325 (also referred to as a local storage device or local storage), an input device 330, an output device 335, and a communication interface 340. In some implementations, device 300 may include additional components, fewer components, different components, or differently arranged components.

Bus 305 may include a path that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a mechanism that permits an operator to input information to device 300, such as a control button, a keyboard, a keypad, or another type of input device. Output device 335 may include a mechanism that outputs information to the operator, such as a light emitting diode (LED), a display, or another type of output device. Communication interface 340 may include any transceiver-like mechanism that enables device 300 to communicate with other devices or networks. In one implementation, communication interface 340 may include a wireless interface, a wired interface, or a combination of a wireless interface and a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include space within a single physical storage device or spread across multiple physical storage devices.

The software instructions may be read into main memory 315 from another computer-readable medium, such as storage device 325, or from another device via communication interface 340. The software instructions contained in main memory 315 may cause processor 310 to perform processes that will be described later. Alternatively, hardwired circuitry may be used in place of or in combination with software instructions to implement processes described herein. Thus, implementations described herein are not limited to any specific combination of hardware circuitry and software.

Figure 4:
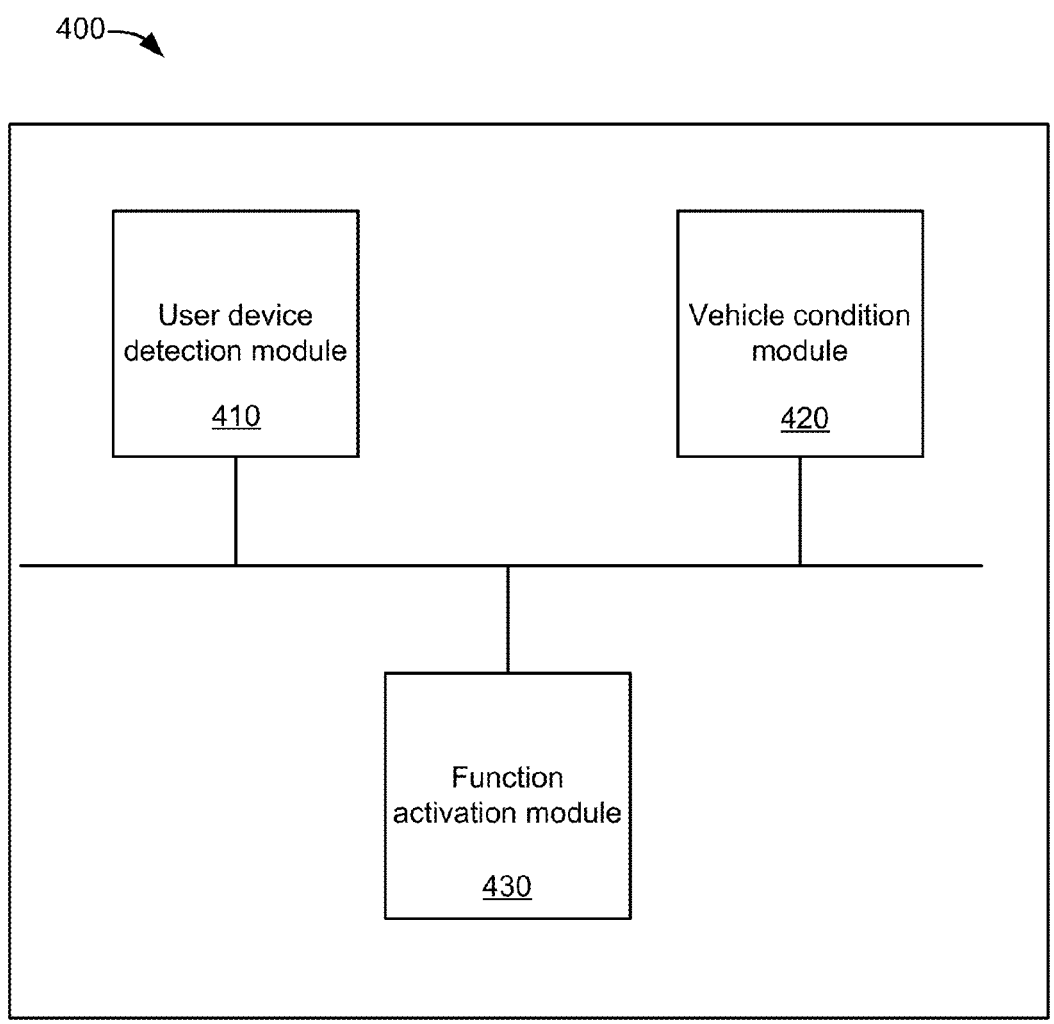
FIG. 4 illustrates example functional components of an example system.

FIG. 4 illustrates example functional components of an example system 400. In some implementations, system 400 may include functional components implemented by a device, such as function control device 230. In some other implementations, system 400 may include functional components implemented by one or more devices, which include or exclude function control device 230. For example, user device 210 and/or key device 220 may include some or all of the functional components of system 400.

As shown in FIG. 4, system 400 may include user device detection module 410, vehicle condition module 420, and/or function activation module 430.

In some implementations, user device detection module 410 may receive an indication from key device 220 that user device 210 has been detected. For example, key device 220 may detect user device 210 based on detecting a signal, associated with user device 210 (e.g., a Bluetooth signal, an NFC signal, and/or some other signal). Additionally, or alternatively, key device 220 may detect user device 210 based on a wired connection (e.g., based on user device 210 being plugged into a user device docking station or similar device).

In some implementations, user device detection module 410 may receive an indication of the detection of multiple user devices 210 (e.g., a user device 210 associated an operator of a vehicle and a user device 210 associated with a passenger of a vehicle). User device detection module 410 may send an instruction to each of the user devices 210 to identify which user device 210 is associated with an operator of a vehicle. Additionally, user device detection module 410 may store information regarding the user device 210 associated with the operator (e.g., in a memory associated with user device detection module). Additionally, or alternatively, user device detection module 410 may identify which user device 210 is associated with an operator of a vehicle based on which user device 210 is in closer proximity to key device 220 (e.g., based on comparing signal strengths of the multiple user devices 210).

Vehicle condition module 420 may identify conditions associated with a corresponding vehicle. For example, vehicle condition module 420 may identify conditions such as a "vehicle moving" condition, a "vehicle stopped" condition, a "parking brake engaged" condition, a "parking brake disengaged" condition, an "engine running" condition, a "vehicle drive gear engaged" condition, a "vehicle reverse gear engaged" condition, or some other vehicle condition or combination of vehicle conditions. Additionally, vehicle condition module 420 may store vehicle conditions (e.g., in a memory associated with vehicle condition module 420). In some implementations, vehicle condition module 420 may determine a vehicle condition based on data received from user device 210 (e.g., vehicle speed data based on a global positioning (GPS) unit of user device 210, cellular tower triangulation data received by user device 210, etc.) and/or based on data received from an on-board diagnostics device, a navigational device, or some other vehicle analytics device associated with the vehicle.

Function activation module 430 may activate and/or deactivate functions, associated with user device 210, based on detecting that user device 210 is associated with an operator of a vehicle (e.g., based on information stored by user device detection module 410) and based on information associated with vehicle conditions stored by vehicle condition module 420. In some implementations, function activation module 430 may detect a hands-free device (e.g., a voice recognition device, such as a Bluetooth headset, a wired headset, a user device docking station, etc.) connected to user device 210 based on receiving an indication from user device 210 that a hands-free device is connected to user device 210. In some implementations, function activation module 430 may permit user device 210 to perform an otherwise prohibited function when an instruction to perform the function is received by user device 210 from a hands-free device, regardless of vehicle conditions. Additionally, or alternatively, function activation module 430 may activate a particular function to permit user device 210 to perform the function when an instruction to perform the function is received from a source other than a hands-free device (e.g., manual input).

For example, function activation module 430 may permit user device 210 to perform a particular function (e.g., place a telephone call) when an instruction to perform the function is received from a source other than a hands-free device and when the vehicle is associated with the vehicle conditions of "vehicle stopped" and "parking brake disengaged." Additionally, or alternatively, function activation module 430 may deactivate a function to prevent user device 210 from performing the function (e.g., sending a text message) when an instruction to perform the function is received from a source other than a hands-free device and when the vehicle is associated with the vehicle conditions of "vehicle stopped" and "parking brake disengaged." Some example implementations of function activation module 430 are described below with respect to data structure 500.

In some implementations, function activation module 430 may permit user device 210 to perform a particular function based on receiving an override instruction from user device 210. For example, the override instruction may be received based on receiving a complex series of keystrokes from user device 210 which the operator of the vehicle could not input while a passenger of the vehicle could input. Additionally, or alternatively, function activation module 430 may permit user device 210 to perform a particular function based on detecting that user device 210 has moved away from key device 220 (e.g., to a passenger seat, associated with the vehicle).

FIG. 5 illustrates an example data structure 500 that may be stored by one or more devices, such as function control device 230. In one implementation, data structure 500 may be stored in a memory of function control device 230. In another implementation, data structure 500 may be stored in a memory separate from, but accessible by function control device 230. For example, data structure 500 may be stored by user device 210. Each entry, associated with data structure 500, may correspond to particular functions which user device 210 may perform when an instruction to perform the function is received from a source other than from a hands-free device (e.g., manual input) and based on vehicle conditions.

As shown in FIG. 5, data structure 500 may include vehicle condition field 510 and/or function activation rules field 520. In some implementations, data structure 500 may include additional fields, fewer fields, different fields, or differently arranged fields than are shown in FIG. 5.

Vehicle condition field 510 may store information identifying possible vehicle conditions. For example, vehicle condition file 510 may store a "parking brake engaged" condition, a "parking brake disengaged" condition, a "vehicle moving" condition, a "vehicle not moving condition", and "engine running" condition, or a combination of vehicle conditions, such as "vehicle not moving, parking brake disengaged" condition. Additionally, or alternatively, vehicle condition field 510 may store some information identifying some other vehicle condition.

Function activation rules field 520 may store rules to identify particular functions which user device 210 may perform when an instruction to perform the function is received from a source other than a hands-free device (e.g., manual input) and based on vehicle conditions. In some implementations, function activation module 430 may activate and/or deactivate particular functions of user device 210 based on information stored by function activation rules field 520.

As shown in FIG. 5, an indication of "X" identifies functions which function activation module 430 may deactivate (e.g., functions which function activation module 430 may prevent user device 210 from performing when an instruction to perform the function is received by user device 210 from a source other than a hands-free device based on a particular vehicle condition. In one example implementation, function activation rules field 520 may store information to prevent user device 210 from sending a text message when the "vehicle moving" condition is met and when the instruction to send the text message is received by user device 210 from a source other than a hands-free device. In one example implementation, function activation rules field 520 may store information to permit user device 210 to place voice calls when the vehicle condition "parking brake engaged" is met and when the instruction to place the voice call is received from a source other than a hands-free device. As described above, function activation module 430 may permit user device 210 to perform any function for any vehicle condition when an instruction to perform the function is received via a hands-free device. Alternatively, function activation module 430 may prevent user device 210 from performing a particular function even when the instruction to perform the function is received from a hands-free device. While specific rules are shown in FIG. 5, in practice, it will be apparent that data structure 500 may store any combination of rules used to activate and/or deactivate functions of user device 210.

Figure 6:
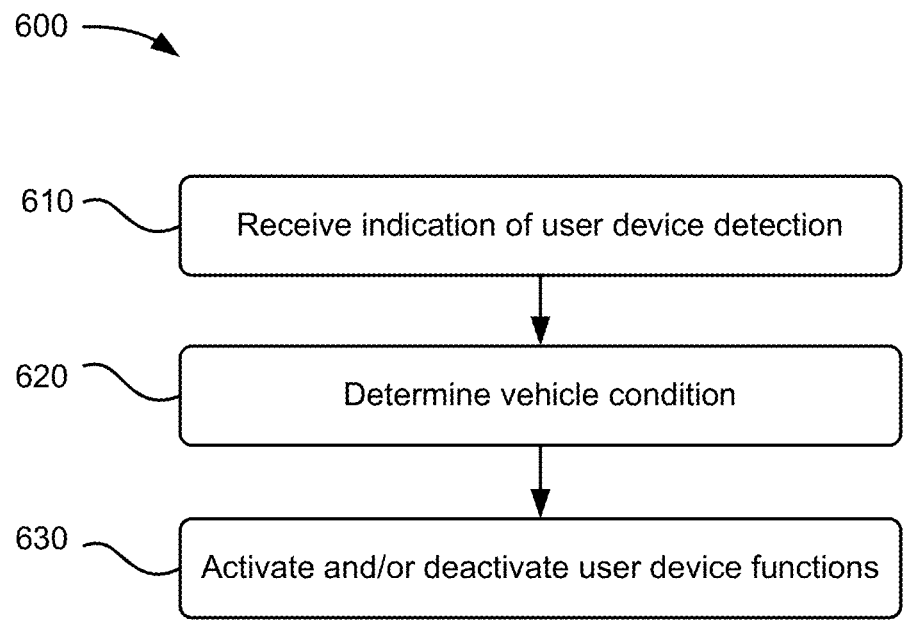
FIG. 6 illustrates a flowchart of an example process for activating and/or deactivating user device functions.

FIG. 6 illustrates a flowchart of an example process 600 for activating and/or deactivating user device functions. In one implementation, process 600 may be performed by one or more components of function control device 230, such as processor 310 of function control device 230. In another implementation, one or more blocks of process 600 may be performed by one or more components of another device (e.g., user device 210 or key device 220), or a group of devices including or excluding function control device 230.

Process 600 may include receiving an indication of user device 210 detection (block 610). For example, as described above with respect to user device detection module 410, function control device 230 may receive an indication from key device 220 that user device 210 has been detected. For example, key device 220 may detect user device 210 based on detecting a signal, associated with user device 210 (e.g., a Bluetooth signal, an NFC signal, and/or some other signal). Additionally, or alternatively, key device 220 may detect user device 210 based on a wired connection. In some implementations, function control device 230 may receive an indication of user device 210 associated with an operator of a vehicle (e.g., when user device detection module 410 detects multiple user devices 210 and determines which user device 210 is associated with the operator of the vehicle).

Process 600 may further include determining a vehicle condition (block 620). For example, as described above with respect to vehicle condition module 420, function control device 230 may identify conditions associated with a corresponding vehicle. For example, function control device 230 may identify conditions, such as a "vehicle moving" condition, a "vehicle stopped" condition, a "parking brake engaged" condition, a "parking brake disengaged" condition, an "engine running" condition, a "vehicle drive gear engaged" condition, a "vehicle reverse gear engaged" condition, or some other vehicle condition or combination of vehicle conditions. In some implementations, function control device 230 may determine a vehicle condition based on data received from user device 210 (e.g., vehicle speed data based on a global positioning (GPS) unit of user device 210, cellular tower triangulation data received by user device 210, etc.) and/or based on data received from an on-board diagnostics device, navigational device, or some other vehicle analytics device associated with the vehicle of function control module 230.

Process 600 may further include activating and/or deactivating user device 210 functions (block 630). For example, as described above with respect to function activation module 430, function control device 230 may activate and/or deactivate functions, associated with user device 210, based on detecting an instance user device 210 associated with an operator of a vehicle (e.g., based on information stored by user device detection module 410) and based on information associated with vehicle conditions stored by vehicle condition module 420.

As described above, in some implementations, function control module 430 may permit user device 210 to perform a function when an instruction to perform the function is received by user device 210 from a hands-free device (e.g., a voice recognition device), regardless of vehicle conditions. Additionally, or alternatively, function control device 230 may activate a particular function to permit user device 210 to perform the function when an instruction to perform the function is received from a source other than a hands-free device (e.g., manual input). Additionally, or alternatively, function control device 230 may deactivate a particular function to prevent user device 210 from performing the function when an instruction to perform the function is received from a source other than a hands-free device. For example, function control module 430 may send an instruction to user device 210 to activate or deactivate particular functions. In some implementations, user device 210 may include software to interpret and execute the instruction to activate or deactivate particular functions. In some implementations, the software may cause user device 210 to operate under the control of function control device 230. Alternatively, the software may execute instructions received by function control device 230.

Figure 7:
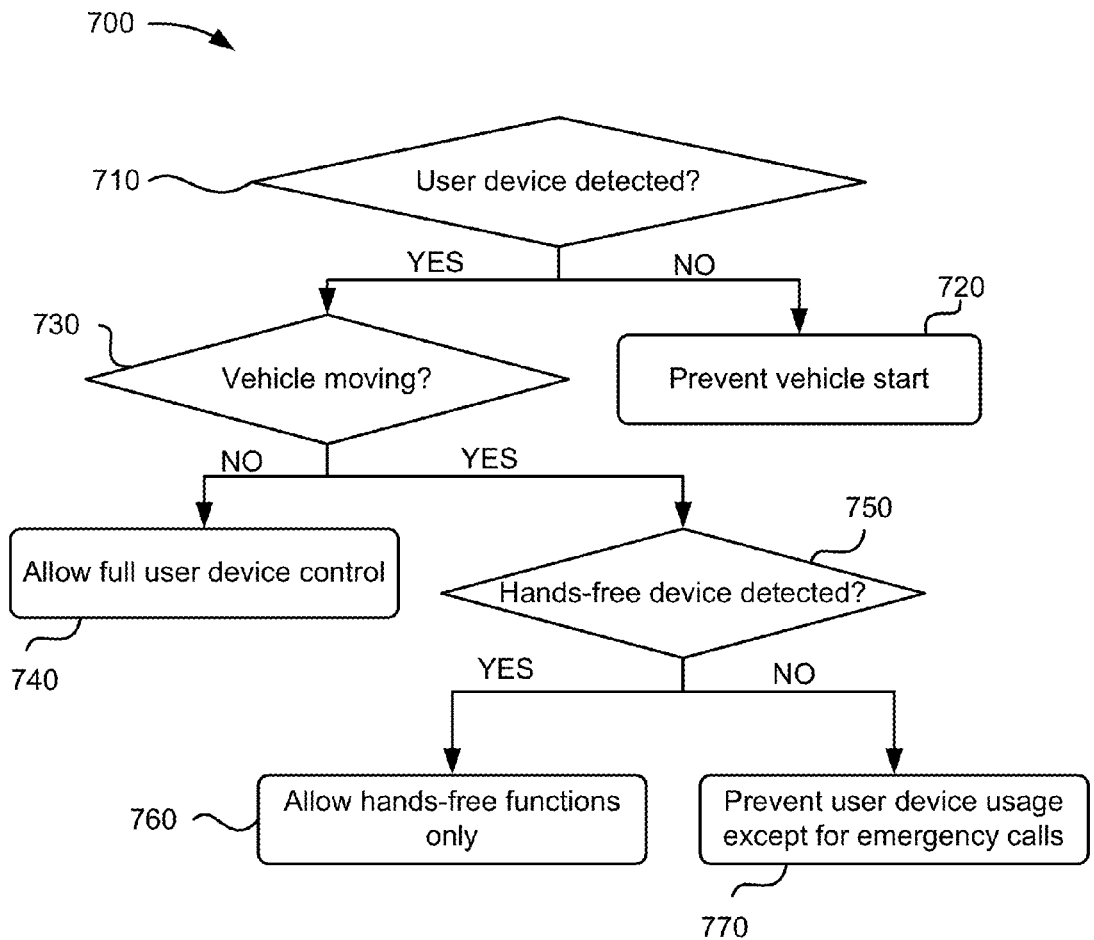
FIG. 7 illustrates a flowchart of an example process for preventing manual user device usage while operating a vehicle.

FIG. 7 illustrates a flowchart of an example process for preventing manual user device usage while operating a vehicle. In one implementation, process 700 may be performed by one or more components of function control device 230, such as processor 310 of function control device 230. In another implementation, one or more blocks of process 700 may be performed by one or more components of another device (e.g., user device 210 or key device 220), or a group of devices including or excluding function control device 230. In some implementations, process 700 may describe an example implementation of activating and/or deactivating particular functions based on information stored by data structure 500.

Process 700 may include determining whether user device 210 has been detected (block 710). For example, as described above with respect to user device detection module 410, function control device 230 may receive an indication from key device 220 that user device 210 has been detected within a vehicle.

If, for example, user device 210 has not been detected (block 710-NO), process 700 may include preventing the vehicle from starting (block 720). For example, function control device 230 may send an instruction to a vehicle control device (e.g., a vehicle central computer, or some other device) to prevent the vehicle from starting (e.g., by preventing the vehicle control device to initiate an engine ignition process).

If on the other hand, user device 210 has been detected (block 710-YES), process 700 may further include determining whether the vehicle is moving (block 730). For example, as described above with respect to vehicle condition module 420, function control device 230 may determine whether the vehicle is moving based on data received from user device 210 (e.g., vehicle speed data based on a global positioning (GPS) unit of user device 210, cellular tower triangulation data received by user device 210, etc.) and/or based on data received from an on-board diagnostics device, navigational device, or some other vehicle analytics device associated with the vehicle of function control module 230.

If the vehicle is not moving (block 730-NO), process 700 may further include allowing full user device 210 control (block 740). For example, function control device 230 may control functions, associated with user device 210, based on detecting user device 210 as described above. In some implementations, function control device 230 may allow user device 210 to perform a function when an instruction to perform the function is received from any source (e.g., via manual input, a hands-free device, or some other source).

If, on the other hand, the vehicle is moving (block 730-YES), process 700 may further include determining whether a hands-free device has been detected (block 750). For example, as described above with respect to function activation module 430, function control device 230 may detect a hands-free device (e.g., a voice recognition device, such as a Bluetooth headset, a wired headset, a user device docking station, etc.) connected to user device 210 based on receiving an indication from user device 210 that a hands-free device is connected to user device 210.

If a hands-free device is detected (block 750-YES), process 700 may include allowing hands-free functions only (block 760). For example, function control device 230 may send an instruction to user device 210 to cause user device 210 to display a lock-screen such that only instructions relating to placing an emergency call may be received via a source other than a hands-free device (e.g., manual input), while instructions received from a hands-free device (e.g., a Bluetooth headset, a wired headset, a wireless headset, a docking station for user device 210, etc.) may be performed (e.g., instructions to place a voice call, send an e-mail message, send a text message, select and play audio or video, etc.) Alternatively, function control device 230 may send an instruction to cause user device 210 to disable a display, associated with user device 210, such that a user may not manually operate user device 210.

If, on the other hand, a hands-free device is not detected (block 750-NO), process 700 may include preventing user device 210 usage except for emergency calls (block 770). For example, function control device 230 may send an instruction to user device 210 to cause user device 210 to display a lock-screen such that only instructions relating to placing an emergency call may be received via a source other than a hands-free device (e.g., manual input). Alternatively, function control device 230 may send an instruction to cause user device 210 to disable a display, associated with user device 210, such that a user may not operate user device 210.

Figure 8:
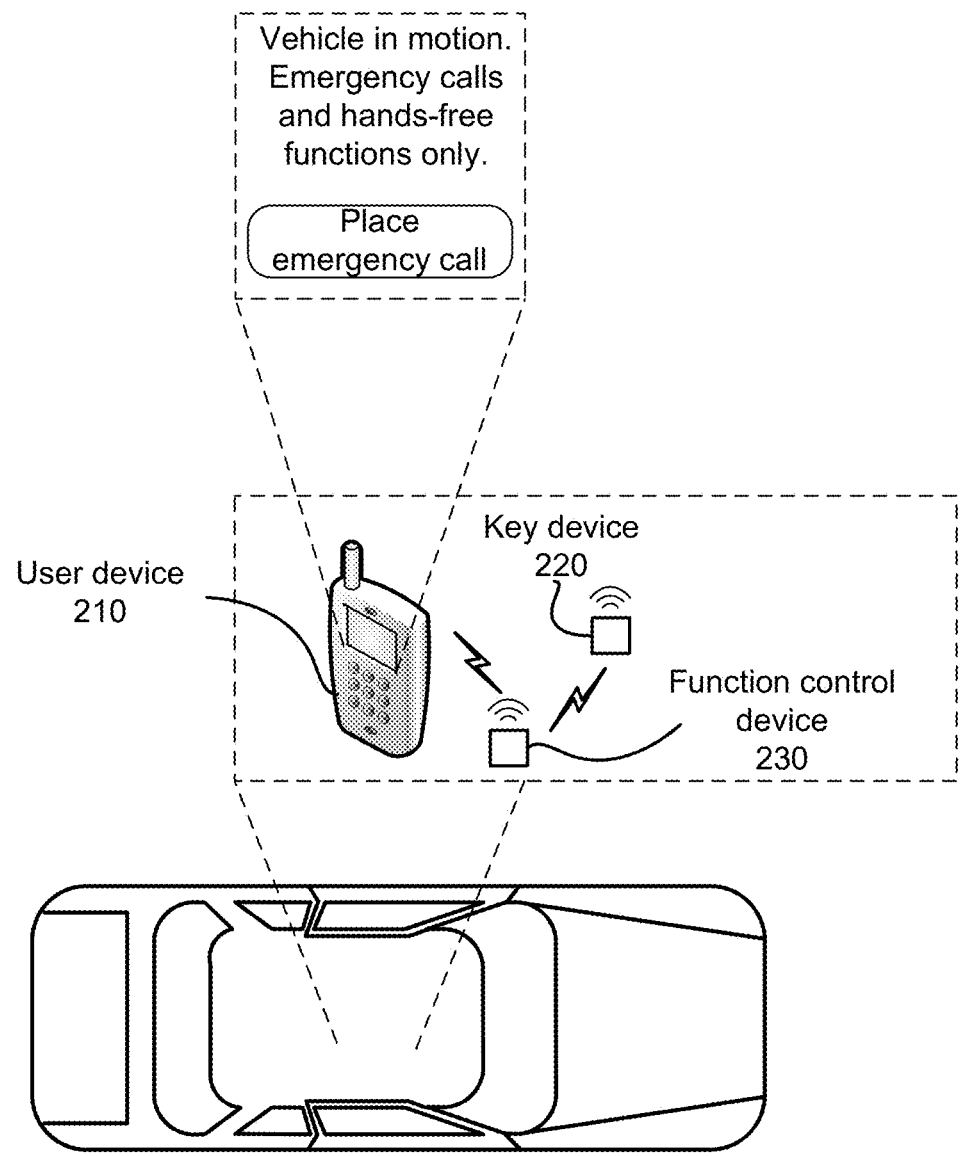
FIG. 8 illustrates an example implementation described herein.

FIG. 8 illustrates an example implementation described herein. In FIG. 8, assume that user device 210 is associated with an operator of a vehicle, and that key device 220 detects user device 210 (e.g., based on a wired or wireless connection with user device 210). Further assume that function control device 230 receives an indication that user device 210 has been detected and that function control device 230 determines a vehicle condition of "vehicle moving."

As described above, function control device 230 may permit user device 210 to perform a function when an instruction to perform the function is received by user device 210 from a hands-free device (e.g., a voice recognition device). Additionally, function control device 230 may deactivate a function (e.g., sending a text message, placing a telephone call, etc.) to prevent user device 210 from performing the function when an instruction to perform the function is received from a source other than a hands-free device (e.g., manual input) and when the vehicle is associated with the vehicle condition of "vehicle moving," except when the instruction is related to placing an emergency call (e.g., a call associated with a publicly designated emergency number). For example, as shown in FIG. 8, function control device 230 may cause user device 210 to display a lock-screen such that only instructions relating to placing an emergency call may be received via a source other than a hands-free device (e.g., manual input). In some implementations, user device 210 may display a button to automatically call a pre-designated emergency telephone number.

As described above, function control device 230 may identify user device 210 associated with the operator of a vehicle, determine vehicle conditions, and activate and/or deactivate functions associated with user device 210 based on vehicle conditions. As a result, function control device 230 may prevent the operator from manually interacting with using user device 210 while the vehicle is in motion. In some implementations, function control device 230 may prevent a vehicle from starting when function control device 230 does not detect user device 210 (and therefore does not control user device 210). As a result, an operator of a vehicle may only operate the vehicle when function control device 230 controls user device 210, thereby preventing the operator from manually interacting with user device 210 while the vehicle is in motion.

The foregoing description provides illustration and description, but is not intended to be exhaustive or to limit the possible implementations to the precise form disclosed. Modifications and variations are possible in light of the above disclosure or may be acquired from practice of the implementations. For example, while series of blocks have been described with regards to FIGS. 6-7, the order of the blocks may be modified in other implementations. Further, non-dependent blocks may be performed in parallel.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:
1. A method comprising:
receiving, by a first device and from a second device, an indication of a presence of a third device inside of a vehicle,
the first device being different than the second device,
the second device being a key device, and
the first device being located inside the vehicle;
receiving, by the first device, data associated with the vehicle,
the data corresponding to status information of the vehicle;
determining, by the first device and based on the data associated with the vehicle, a vehicle conditional of the vehicle;

accessing, by the first device and based on determining the vehicle condition, vehicle condition information and activation rules information,
  the vehicle condition information including a plurality of conditions, and
  the activation rules information including a plurality of rules,
    each condition, of the plurality of conditions, being associated with the plurality of rules;
determining, by the first device, that the third device is associated with an operator of the vehicle based on a physical proximity of the third device to the second device; and
deactivating, by the first device and based on accessing the vehicle condition information and the activation rules information and determining that the third device is associated with the operator of the vehicle, a function associated with the third device based on the vehicle condition,
  the first device preventing the third device from performing the deactivated function when an instruction to perform the deactivated function is received by the third device via manual input, and
  the first device permitting the third device to perform the deactivated function when the instruction to perform the deactivated function is received by the third device via a hands-free device.

2. The method of claim 1, further comprising:
determining a change in the vehicle condition; and
reactivating the deactivated function based on the change in the vehicle condition,
  the first device permitting the third device to perform the reactivated function when an instruction to perform the reactivated function is received by the third device via manual input or via the hands-free device.

3. The method of claim 1,
where the physical proximity of the third device to the second device is determined based on a signal strength between the third device and the second device.

4. The method of claim 1, where receiving the indication of the presence of the third device is performed independent of user interaction.

5. The method of claim 1, where receiving the indication of the presence of the third device is based on a near field communications (NFC) signal, a Bluetooth signal, or a wired signal associated with the second device.

6. The method of claim 1, where the data, associated with the vehicle, is received from a vehicle analytics device associated with the vehicle.

7. The method of claim 1, where the vehicle condition relates to when the vehicle is moving or when the vehicle is not moving.

8. The method of claim 1, further comprising:
determining that the third device is not located inside of the vehicle; and
preventing, based on determining that the third device is not located inside of the vehicle, the vehicle from starting.

9. A system comprising:
a device, located inside a vehicle, to:
  receive, from a key device, an indication of a presence of a user device inside the vehicle,
    the device being different than the key device;
  receive data associated with the vehicle,
    the data corresponding to status information of the vehicle;
  determine, based on the data associated with the vehicle, a vehicle condition of the vehicle;
  access, based on determining the vehicle condition, vehicle condition information and activation rules information,
    the vehicle condition information including a plurality of conditions, and
    the activation rules information including a plurality of rules,
      each condition, of the plurality of conditions, being associated with the plurality of rules;
  determine that the user device is associated with an operator of the vehicle based on a physical proximity of the user device to the key device; and
  deactivate, based on accessing the vehicle condition information and the activation rules information and based on determining that the user device is associated with the operator of the vehicle, a function associated with the user device based on the vehicle condition,
    the device causing the user device to prohibit the deactivated function when an instruction to perform the deactivated function is received by the user device via manual input, and
    the device causing the user device to permit the deactivated function when the instruction to perform the deactivated function is received by the user device via a hands-free device.

10. The system of claim 9, where the device is further to:
determine a change in the vehicle condition;
reactivate the deactivated function based on the change in the vehicle condition,
  the device causing the user device to permit the reactivated function when an instruction to perform the reactivated function is received by the user device via manual input or via the hands-free device.

11. The system of claim 9, where, when receiving the indication of the presence of the user device, the device is further to:
receive the indication of the presence of the user device independent of user interaction.

12. The system of claim 9, where, when receiving the indication of the presence of the user device, the device is further to:
receive the indication of the presence of the user device based on a near field communications (NFC) signal, a Bluetooth signal, or a wired signal associated with the key device.

13. The system of claim 9, where, when receiving the data, associated with the vehicle, the device is further to:
receive the data from a vehicle analytics device associated with the vehicle.

14. The system of claim 9, where the vehicle condition relates to when the vehicle is moving.

15. The system of claim 9, where the device is further to:
determine that the user device is not located inside of the vehicle; and
prevent, based on determining that the user device is not located inside of the vehicle, the vehicle from starting.

16. A non-transitory computer-readable medium storing instructions, the instructions comprising:
a plurality of instructions, which, when executed by one or more processors associated with a first device, cause the one or more processors to:
  receive, from a second device, an indication of a presence of a user device inside a vehicle,
    the first device being different than the second device, the second device being a key device, and
the first device being located inside of the vehicle;
receive data associated with the vehicle,
the data corresponding to status information of the vehicle;
determine, based on the data associated with the vehicle, a vehicle condition;
access, based on determining the vehicle condition, vehicle condition information and activation rules information,
the vehicle condition information including a plurality of conditions, and
the activation rules information including a plurality of rules,
each condition, of the plurality of conditions, being associated with the plurality of rules;
determine that the user device is associated with an operator of the vehicle based on a physical proximity of the user device to the second device;
deactivate, based on accessing the vehicle condition information and the activation rules information and based on determining that the user device is associated with the operator of the vehicle, a function associated with the user device based on the vehicle condition;
the first device preventing the user device from performing the deactivated function when an instruction to perform the deactivated function is received by the user device via manual input, and
the first device permitting the user device to perform the deactivated function when the instruction to perform the deactivated function is received by the user device via a hands-free device;
determine a change in the vehicle condition; and
reactivate the deactivated function based on the change in the vehicle condition,
the first device permitting the user device to perform the reactivated function when an instruction to perform the reactivated function is received by the user device via manual input or via the hands-free device.

17. The non-transitory computer-readable medium of claim 16, where the
physical proximity of the user device to the second device is determined based on a signal strength between the user device and the second device.

18. The non-transitory computer-readable medium of claim 16, where the plurality of instructions further cause the one or more processors to:
determine that the user device is not associated with an operator of the vehicle; and
permit all functions of the user device based on determining that the user device is not associated with the operator of the vehicle.

19. The non-transitory computer-readable medium of claim 16, where one or more instructions, of the plurality of instructions, to receive the indication of the presence of the user device, include one or more instructions to cause the one or more processors to:
receive the indication of the presence of the user device based on a near field communications (NFC) signal, a Bluetooth signal, or a wired signal associated with the second device.

20. The non-transitory computer-readable medium of claim 16, where one or more instructions, of the plurality of instructions, to receive the data, associated with the vehicle, include one or more instructions to cause the one or more processors to:
receive the data, associated with the vehicle, from a vehicle analytics device associated with the vehicle.

21. The non-transitory computer-readable medium of claim 16, where the vehicle condition relates to when the vehicle is moving or when the vehicle is not moving.

22. The non-transitory computer-readable medium of claim 16, where the plurality of instructions further cause the one or more processors to:
determine that the user device is not located inside of the vehicle; and
prevent, based on determining that the user device is not located inside of the vehicle, the vehicle from starting.

* * * * *